United States Patent [19]

Kato

[11] Patent Number: 4,583,144

[45] Date of Patent: Apr. 15, 1986

[54] MAGNETIC RECORDING DISC CARTRIDGE

[75] Inventor: Yoshitake Kato, Ibaragi, Japan

[73] Assignee: Hitachi Maxell, Ltd., Osaka, Japan

[21] Appl. No.: 465,251

[22] Filed: Feb. 9, 1983

[30] Foreign Application Priority Data

| Feb. 10, 1982 | [JP] | Japan | 57-17364 |
| Feb. 10, 1982 | [JP] | Japan | 57-17365 |
| Feb. 10, 1982 | [JP] | Japan | 57-17366 |
| Feb. 10, 1982 | [JP] | Japan | 57-17367 |
| Feb. 10, 1982 | [JP] | Japan | 57-17369 |
| Feb. 10, 1982 | [JP] | Japan | 57-17370 |
| Mar. 13, 1982 | [JP] | Japan | 57-34640 |
| Apr. 10, 1982 | [JP] | Japan | 57-52474 |

[51] Int. Cl.$^4$ .............................................. G11B 23/03
[52] U.S. Cl. ..................................... 360/133; 360/135
[58] Field of Search ................................. 360/133, 135

[56] References Cited

U.S. PATENT DOCUMENTS 4,149,207 4/1979 Porter .................................. 360/133
4,152,740 5/1979 Stratton .......................... 360/133 X Primary Examiner—A. J. Heinz
Attorney, Agent, or Firm—Birch, Stewart, Kolasch & Birch

[57] ABSTRACT

In a magnetic recording disc cartridge, a hub assembly composed of an upper hub member and a lower hub member inseparably connected with each other clamps the peripheral portion of a central hole defined in a magnetic recording sheet between inner stepped portions of surfaces of the hub members with a portion of the magnetic recording sheet opposed to outer portions of the hub members remaining unclamped.

7 Claims, 23 Drawing Figures

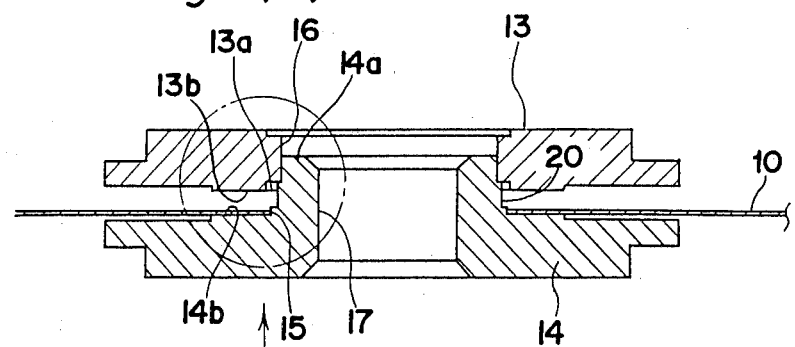
Fig.4(A)
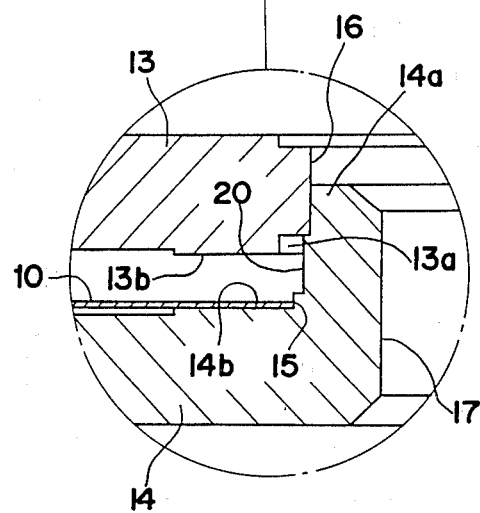
Fig.4(A')
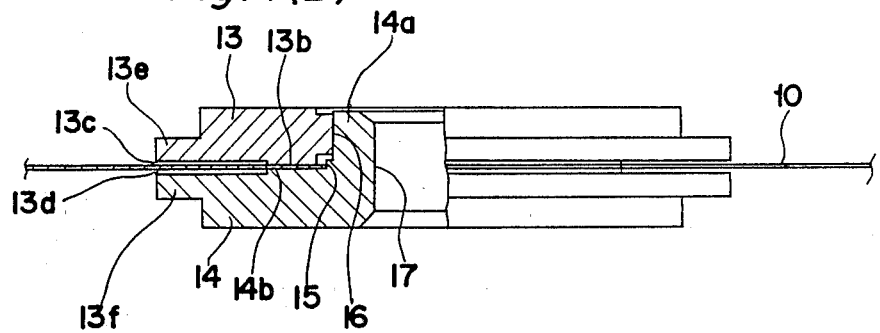
Fig.4(B)

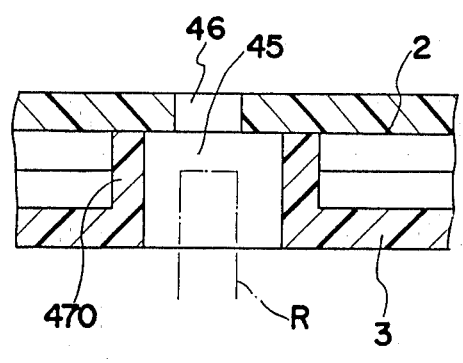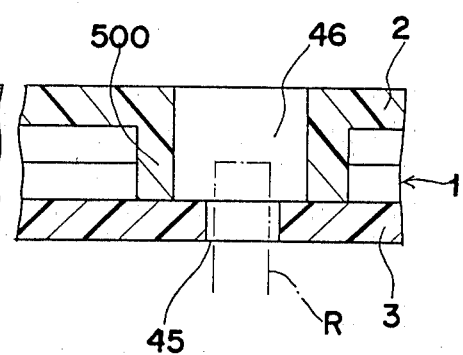

MAGNETIC RECORDING DISC CARTRIDGE

FIELD OF THE INVENTION

The present invention relates to a magnetic recording disc cartridge, which is a so called a floppy disc, for reproducing magnetic records such as sound signals, video signals and data signals.

BACKGROUND OF THE INVENTION

There has recently been proposed a magnetic recording disc cartridge which comprises a hard-type cartridge case composed of a vertically separable pair of sections which are usually connected with each other by ultrasonic welding and a magnetic recording disc, which is a so called floppy disc, contained in the cartridge case. The magnetic recording disc is formed by a magnetic recording sheet and a hub assembly composed of a pair of upper and lower hub members for holding the magnetic sheet therebetween at the peripheral portion of a central hole defined therein. The magnetic recording disc cartridge is mounted in a magnetic recording/reproducing apparatus so that the hub assembly is engaged with a drive shaft of the recording/reproducing apparatus to rotatingly drive the magnetic recording disc with an opening for receiving a magnetic recording head of a recording/reproducing apparatus opened. Opening and closing of the opening are controlled by a shutter member which is rotatingly operated from the outside by a flexible slider means. The cartridge case further includes a transparent hole in the vicinity of the peripheral walls thereof for transmitting optical signals for detecting prevention of recording.

In such a proposed magnetic recording disc cartridge, the hub assembly generally comprises an upper hub member and a lower hub member which are inseparably connected with each other with the peripheral portion of the central hole of the magnetic recording sheet interposed and clamped between the pair of hub members. Under such a state, deformation caused by the clamping force in the interposed portion of the magnetic recording sheet tends to extend outwardly in the outer peripheral direction of the magnetic recording sheet in addition to the central hole. However, according to the proposed magnetic recording disc cartridge, the peripheral portion of the central hole of the magnetic recording sheet is clamped by the entire opposite surfaces of the hub members up to the outer peripheries of the hub members, the magnetic recording sheet is largely deformed over the outer peripheries of the hub members, leading to difficulty in securing evenness of the magnetic recording sheet.

In connecting the top section and the bottom section of the cartridge case by ultrasonic welding means, relative deviation thereof should be strictly prevented to improve the mechanical strength of the portion around the opening for receiving the magnetic recording head so that the magnetic recording disc cartridge may accurately be mounted in the recording/reproducing apparatus.

With respect to the shutter member which is rotatably mounted in the cartridge case, there is provided a return spring between a projection formed in a slider for rotatingly moving the shutter member between an opened position and a closed position and a spring contact pin formed in the cartridge case rearward of the projection. When, in such construction, the shutter member is rotatingly moved to the open position, the spring contact portion of the projection of the slider is subjected to a large spring returning force while the projection is exposedly provided in the outer portion of the cartridge case for operation from the exterior of the cartridge case, leading to disengagement of the projection of the slider from an arcuate guide groove therefor and detachment of the spring from a recessed engaging portion formed in the projection of the slider, thereby causing complicated assembling operation of the slider and difficulty in appropriate operation.

Besides, in rotating the shutter member toward the closing position, the slider is elastically deformed in an arcuate form between the open position and the closed position of the shutter member and tends to be outwardly sprung during sliding movement therebetween. Particularly when the forward end portion of the slider is formed thin to facilitate bending thereof, even slight vibration may cause the deformed portion of the slider to be disengaged from the sliding groove thereof, with the forward end portion of the slider striking a stopper wall of the shutter member in the closed position to disable the closing operation of the shutter member.

In the proposed magnetic recording disc cartridge, further, there is provided a means for preventing erroneous erasing of recorded information by opening and closing the transparent hole for transmitting the optical signal for detecting prevention of recording. The erroneous erasing prevention means comprises a movable member formed by a thin plate having a one-armed resilient member, which is arranged in a sliding portion formed in the cartridge case. The movable member is provided in its upper surface with a projection which is operated through a slot formed in the upper wall surface of the cartridge case, though, if the upper portion of the said projection is placed below the upper wall surface of the cartridge case, it is difficult to manually operate the same from outside the cartridge case. On the other hand, if the projection extends over the upper wall surface of the cartridge case, it may cause erroneous operation by unexpected contact by the operator, to reduce reliability of the erroneous erasing prevention member.

SUMMARY OF THE INVENTION

In consideration of the aforementioned disadvantages of the prior art, an essential object of the present invention is to provide a magnetic recording disc cartridge which can reliably prevent deformation of a magnetic recording disc which is interposingly held at the peripheral portion of a central hole formed therein between opposite surfaces of a pair of hub members forming a hub assembly.

Another object of the present invention is to provide a magnetic recording disc cartridge in which hub members forming a hub assembly and a magnetic recording disc can be integrally connected together without causing any deformation in a central hole assembly of the magnetic recording disc cartridge into which a drive shaft of a recording/reproducing apparatus is inserted.

According to one aspect of the present invention, there is provided a magnetic recording disc cartridge which comprises a cartridge case composed of a pair of plate members placed opposite to each other. One of the plate members has a first opening for receiving a drive shaft of a recording/reproducing apparatus and a second opening for receiving a magnetic recording head of the recording/reproducing apparatus. The magnetic recording disc cartridge further includes a magnetic recording disc formed by a magnetic recording sheet having a hole defined in the central portion thereof in correspondence to the first opening and a hub assembly mounted about the central hole, and the magnetic recording disc is rotatably contained in the predetermined space between the pair of plate members of the cartridge case so that the hub assembly is opposed to the first opening. The hub assembly is composed of an upper hub member and a lower hub member inseparably connected with each other for clamping the peripheral portion of the central hole of the magnetic recording sheet between the inner portions of the surfaces of the hub members with a portion of the magnetic recording sheet being opposed to the outer portions of the hub members unclamped.

BRIEF EXPLANATION OF THE DRAWINGS

FIG. 4(A) is a cross sectional view showing a hub assembly used in the embodiment of FIG. 1;

FIG. 4(B) is a partial cross sectional view of the hub assembly shown in FIG. 4(A);

FIGS. 13(A) and 13(B) are partial cross sectional views showing the way of insertion of a reference pole into the magnetic recording disc cartridge shown in FIG. 1.

DETAILED DESCRIPTION OF THE INVENTION

Figure 1:
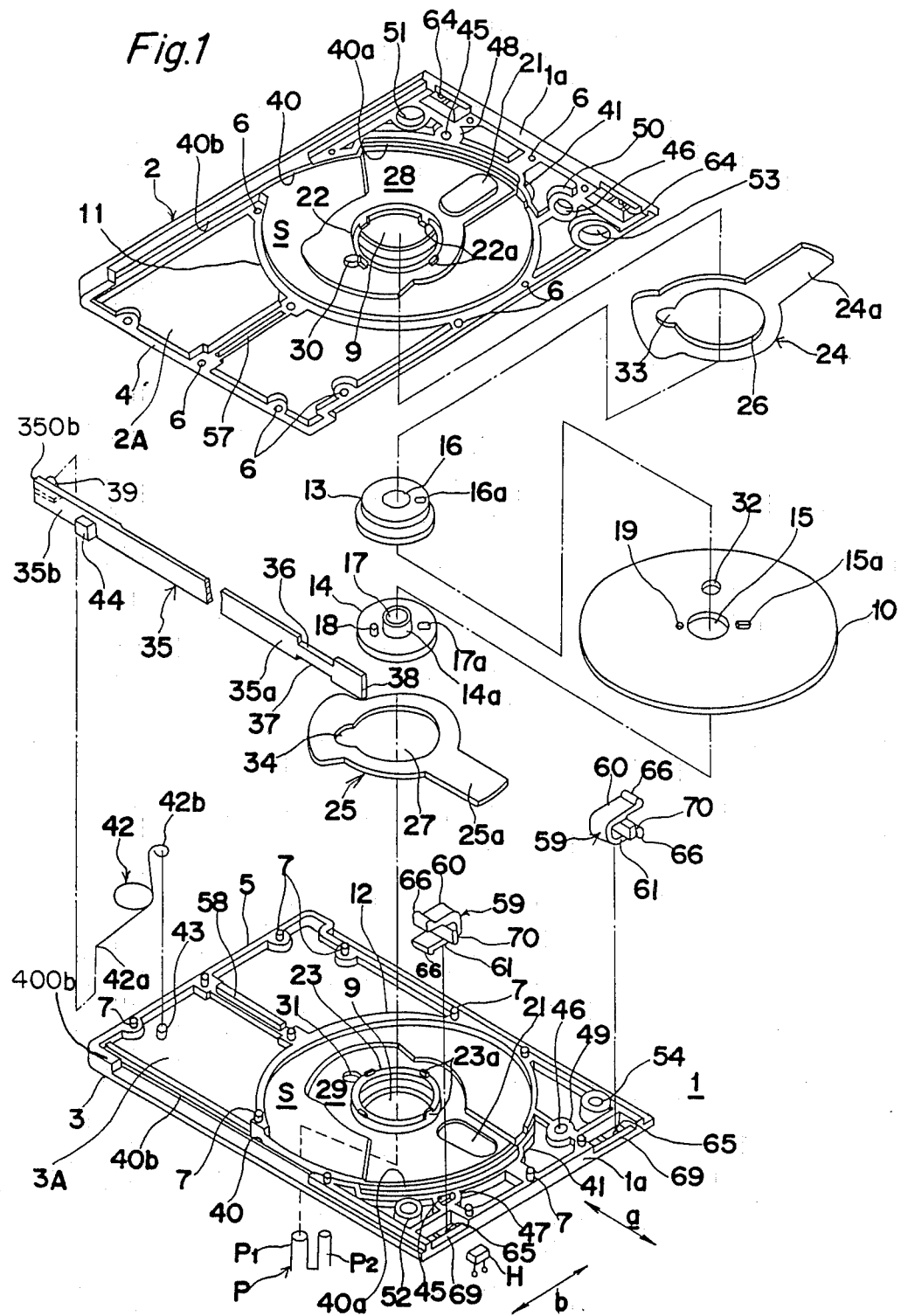
FIG. 1 is an exploded perspective view showing an embodiment of a magnetic recording disc cartridge according to the present invention.
Figure 2:
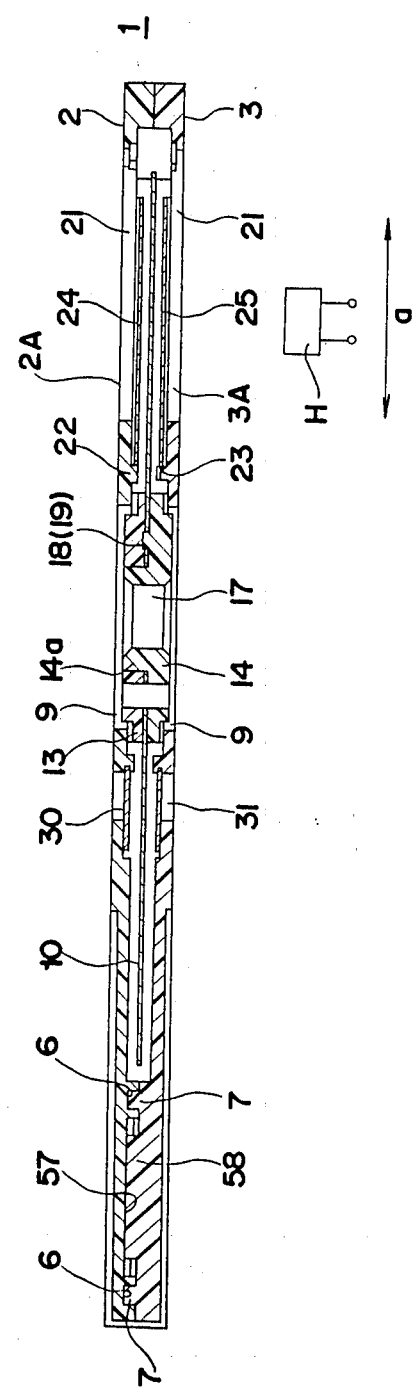
FIG. 2 is a cross sectional view showing the magnetic recording disc cartridge shown in FIG. 1 in an assembled condition.
Figure 3A:
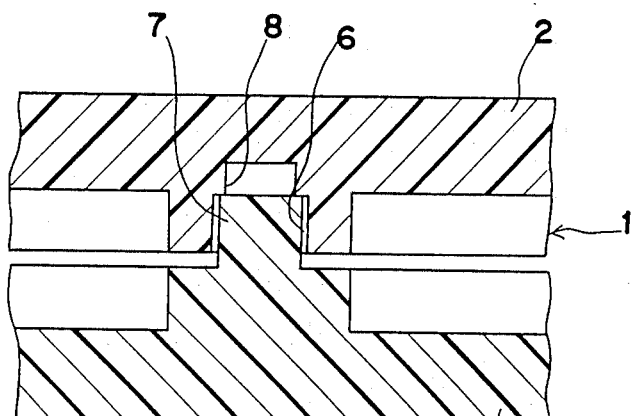
FIGS. 3(A) and 3(B) are cross sectional views showing a way assembling of the top section and the bottom section of the cartridge case shown in FIG. 1.
Figure 3B:
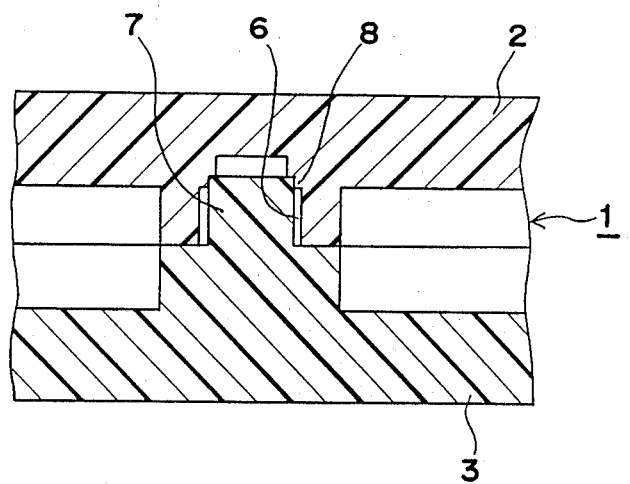

In FIGS. 1 and 2, there is shown an embodiment of a magnetic recording disc cartridge according to the present invention. The magnetic recording disc cartridge comprises a cartridge case 1 made of synthetic resin formed by a top section 2 and a bottom section 3 respectively having generally rectangular flat plates 2A and 3A. The top section 2 and the bottom section 3 are connected together by, e.g., ultrasonic welding means, with respective peripheral walls 4 and 5 being oppositely in contact with each other to form a chamber for accommodating a magnetic recording disc 10. The peripheral walls 4 and 5 are respectively provided with a plurality of welding portions 6 and 7 for connecting the same together, and each of the welding portions 7 of the bottom section 3 is formed as a pin-shaped projection while each of the corresponding welding portions 6 of the top section 2 is formed by a concavity, within which a stepped portion 8 is integrally formed for being in contact with the forward end portion of the projection 7 as shown in Figs. 3(A) and 3(B).

The top section 2 and the bottom section 3 are provided in portions near the front part of the cartridge case 1 with through-holes 9 for receiving a drive shaft P of a recording/reproducing apparatus (not shown). A magnetic recording disc 10 is provided in the form of a flexible sheet which is called a floppy disc and is mounted in the cartridge case 1 coaxially with the through-holes 9, and a pair of partition walls 11 and 12 are formed in the inner wall surfaces of the flat plates 2A and 3A of the top section 2 and the bottom section 3 to substantially enclose a set region S for the magnetic recording disc 10. The partition walls 11 and 12 are generally annularly formed conforming to the outer periphery of the recording disc 10, and function to reinforce the top section 2 and the bottom section 3 and also to prevent dust from entering the set region S.

A pair of hub members 13 and 14 made of synthetic resin and vertically connected with each other are rotatably fitted in the through-holes 9 for holding the magnetic recording disc 10. The magnetic recording disc 10, the upper hub member 13 and the lower hub member 14 are respectively provided with central holes 15, 16 and 17 for receiving a main shaft portion $P_1$ of the drive shaft P of the recording/reproducing apparatus. The drive shaft P further includes a stop member $P_2$ while the magnetic recording disc 10, the upper hub member 13 and the lower hub member 14 respectively have corresponding engaging holes 15a, 16a and 17a for receiving the stop member $P_2$. The central hole 15 and the engaging hole 15a may be joined in one opening depending on the form of the drive shaft P. Likewise, the central hole 16 may be joined with the engaging hole 16a and the central hole 17 may be joined with the engaging hole 17a respectively. Reference numeral 18 indicates a pin member formed in the lower hub member 14 to be inserted in a small hole 19 formed in the magnetic recording disc 10 for preventing rotation of the magnetic recording disc 10 relative to the upper hub member 13.

As shown in FIGS. 4(A) and 4(B), an annular boss 14a is formed in the upper surface of the lower hub member 14 to be engaged in the central hole 16 of the upper hub member 13 and a stepped portion 20 is integrally formed around the outer peripheral surface of the annular boss 14a for ultrasonic welding operation while a groove 13a is formed in the lower end of the inner wall of the central hole 16 of the opposite upper hub member 13 for receiving molten resin.

Figure 4C:
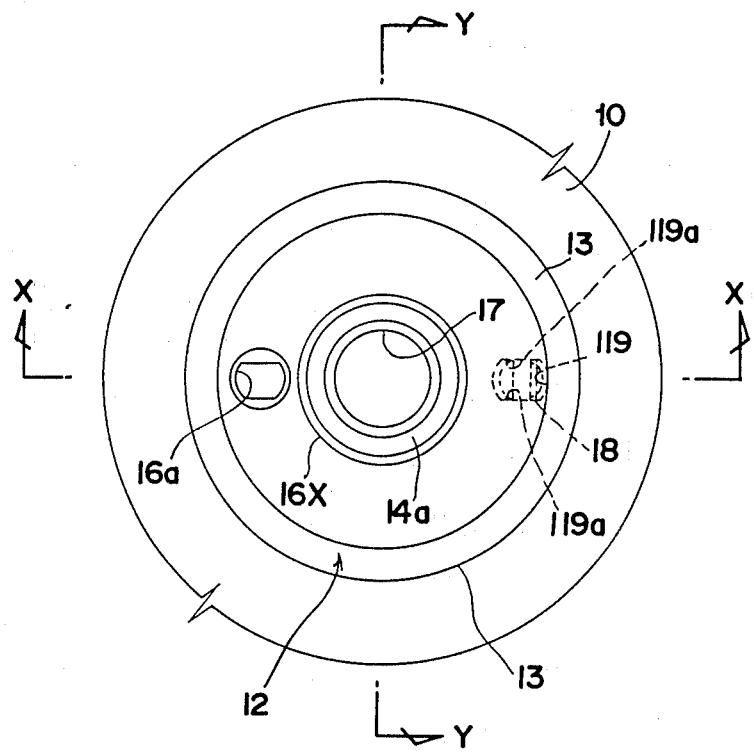
FIG. 4(C) is a top plan view showing the hub assembly.
Figure 4D:
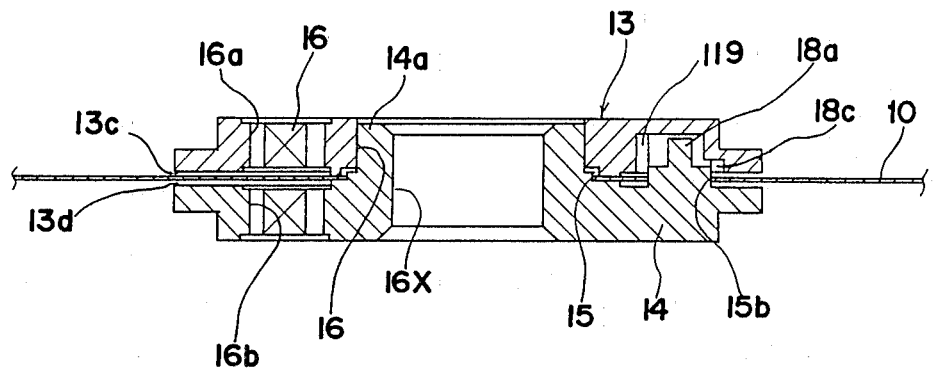
FIG. 4(D) is a cross sectional view showing a modification of the hub assembly shown in FIG. 4(B)

The upper hub member 13 and the lower hub member 14 are separately formed by plastic molding and connected with each other to hold the peripheral portion of the central hole 15 of the magnetic recording disc 10 between the opposite surfaces thereof as shown in FIGS. 4(C) and 4(D).

The annular boss 14a formed in the lower hub member 14 is engaged in the central hole 16 of the upper hub member 13. As shown in the drawings, the lower hub member 14 is provided in its central part with the central hole 17, from the peripheral end portion of which the annular boss 14a is upwardly projected while the central hole 16 is formed in the central part of the upper hub member 13 for receiving the annular boss 14a.

Then the upper hub member 13 and the lower hub member 14 are integrally connected with each other by ultrasonic welding means. For that purpose, the stepped portion 20 is formed around the outer peripheral surface of the annular boss 14a, the lower half of which is made larger in diameter than the upper half thereof. The size of the central hole 16 is so determined that the inner diameter thereof is smaller than the outer diameter of the lower half of the stepped portion 20 while the central hole 16 has the groove 13a for collecting the molten plastic resin material around the peripheral edge of its lower end. Thereafter the upper hub member 13 is engaged with the lower hub member 14 and after the upper hub member 13 is temporarily held by the stepped portion 20, the stepped portion 20 is welded by an ultrasonic welding machine while downwardly pressing the upper hub member 13 so as to weld the outer peripheral surface of the annular boss 14a and the inner peripheral surface of the central hole 16 together. In advance to the aforementioned connecting operation, the magnetic recording disc 10 is interposed between the upper hub member 13 and the lower hub member 14. The magnetic recording disc 10 is so placed on the upper surface of the lower hub member 14 that the central hole 15 thereof is tightly engaged with the annular boss 14a of the lower hub member 14.

Since the upper hub member 13 and the lower hub member 14 are in advance provided with through-holes 16a and 17a, the hub members 13 and 14 should be so aligned and engaged with each other that the through-holes 16a and 17a are coaxially in vertical alignment with each other. In essence, the hub members 13 and 14 are prevented from deviation in the diametrical direction by the tight engagement of the annular boss 14a and the central hole 16, and thus, deviation of the hub members 13 and 14 in the circumferential direction should be independently prevented.

For that purpose, the hub members 13 and 14 are provided in the opposite surfaces thereof with location means by concavo-convex engagement. As shown in FIGS. 4(C) and 4(D), the upper hub member 13 is provided with a slot 119 which is lengthened in the diametrical direction and shortened in the circumferential direction of the hub assembly in a portion opposite to the engaging hole by 180° with interposition of the central hole 17 while the lower hub member 14 is provided with a round shaft 18 which is internally engaged with opposite surfaces 119a of the slot 119 in the circumferential direction of the hub assembly so that the hub members 13 and 14 are prevented from deviation in the circumferential direction thereof by the concavo-convex engagement of the slot 119 and the round shaft 18. The opposite surfaces 119a of the slot 119 are formed in parallel with the center line of the hub assembly preferably in the vertical direction, and configurations of the opposite surfaces 119a in the diametrical direction are not important. With respect to the round shaft 18, the arcuate surface in the circumferential direction of the hub assembly alone functions effectively and the arcuate surface in the diametrical direction is not important. The round shaft 18 shown in the drawings has in its forward end portion a strip-shaped projection 18a which is narrow in width in the diametrical direction and has an arcuately-formed outer end surface in the circumferential direction of the hub assembly to prevent the forward end portion of the round shaft 18 from interference with a stepped surface 18c of the slot 119, though, the entire body of the round shaft 18 may be formed in conformity to the shape of the projection 18a.

Further, the slot 119 may be simply formed in a square shape so that the round shaft 18 is internally in contact with the vertical side surfaces of the slot 119. In a case where pawls are projectingly formed in the central hole 17 to drive the hub assembly, the through-holes 16a and 17a are not necessary and thus the hub members 13 and 14 need not be prevented from deviation in the peripheral direction.

Since the hub members 13 and 14 are thus partially varied in thickness, it is difficult to strictly ensure flatness of the opposite surfaces, i.e., the surfaces of the hub members 13 and 14 for pressing the magnetic recording disc 10 when molding the hub members 13 and 14.

Therefore, as shown in FIGS. 4(A) through 4(D), the hub members 13 and 14 in the embodiment of the present invention are provided with annularly thickened portions having opposite stepped surfaces 13b and 14b projected around the central holes 16 and 17 respectively in portions near the inner surfaces of the central holes 16 and 17 so that the stepped surfaces 13b and 14b alone clamp the peripheral edge of the central hole 15 of the magnetic recording disc 10 therebetween. Thus, there are defined clearances 13c and 13d respectively between both surfaces of the magnetic recording disc 10 and the outer portions 13e and 13f of the hub members 13 and 14, so that portions of the magnetic recording disc 10 opposite to the outer portions 13e and 13f are kept in unclamped conditions.

By virtue of such construction, being different from the type that the entire surfaces of the hub members 13 and 14 hold the magnetic recording disc 10, the magnetic recording disc 10 is not easily deformed since the area of the clamped portion of the magnetic recording disc 10 is small. Even if the magnetic recording disc 10 is deformed, such deformation is absorbed in the clearances 13c and 13d defined between the opposite surfaces of the hub members 13 and 14, and the magnetic recording disc 10 is not further deformed over the outer peripheral surface of the hub assembly.

Both of the hub members 13 and 14 are provided with the stepped surfaces 13b and 14b in the shown embodiment, though, the stepped surface may be formed in the opposite surface of one of the hub members alone and the opposite surface of the other hub member may be formed entirely even.

Figure 4E:
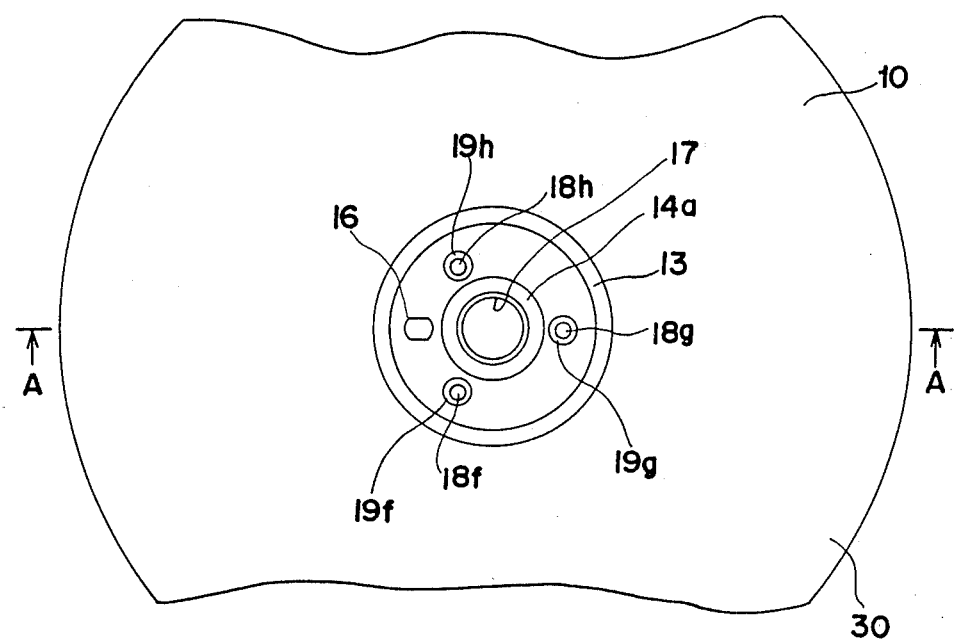
FIG. 4(E) is a top plan view of the hub assembly.
Figure 4F:
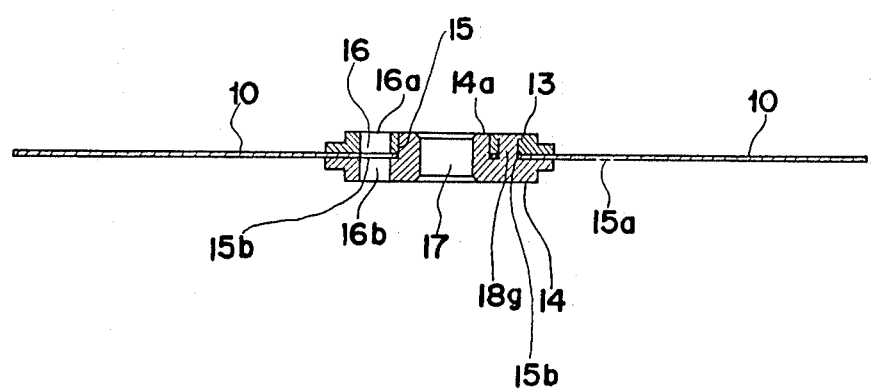
FIG. 4(F) is a cross sectional view showing the hub assembly.
Figure 4G:
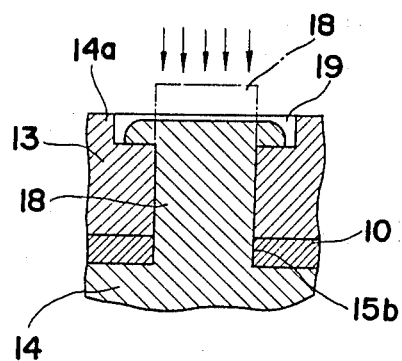
FIG. 4(G) is a partial cross sectional view showing a way of connecting of the upper hub member with the lower hub member.

In FIGS. 4(E), (F) and (G), there is shown a modification of the hub assembly in which a connecting pin is formed in at least one of the upper and lower hub members while the other hub member and the magnetic recording disc are provided with through-holes into which the connecting pin is inserted to integrally connect the magnetic recording disc and the hub members together by thermally deforming the upper end portion of the connecting pin.

In the shown construction, a lower hub member 14 has a boss 14a defining a central hole 17 into which a main shaft portion of a drive shaft (not shown) of the recording/reproducing apparatus can be inserted, an engaging hole 16 engageable with pawls of the drive shaft, a connecting pin 18f also functioning to prevent rotation of a magnetic recording disc 10 and other connecting pins 18g and 18h. The magnetic recording disc 10 has a central hole 15 into which the boss 14a of the lower hub member 14 can be inserted, an engaging hole 16 formed in a position corresponding to the engaging hole 15b of the lower hub member 14 for receiving the pawls of the drive shaft, through-holes 19f, 19g and 19h for receiving the connecting pins 18f, 18g and 18h and an opening 15a for selector indication. As shown in FIGS. 4(E) and (F), the upper hub member 13 has the central hole 17 for receiving the boss 14a of the lower hub member 14, the engaging hole 16 formed in a position corresponding to the engaging hole 15b of the magnetic recording disc 10 for receiving the pawls of the drive shaft and the through-holes 19f, 19g and 19h having stepped portions for receiving the connecting pins 18f 18g and 18h.

It is to be noted that the cartridge case 1 may be replaced by an envelope made of a flexible sheet material.

The magnetic recording disc 10 and the hub members 13 and 14 thus constructed are integrally connected with each other as follows: The boss 14a and the connecting pins 18f, 18g and 18h of the lower hub member 14 are respectively inserted into the central hole 15 and the through-holes 19f, 19g and 19h of the magnetic recording disc 10, and the boss 14a and the connecting pins 18f, 18g and 18h are further inserted into the central hole 15 and the through-holes 19f, 19g and 19h respectively. By virtue of this, the engaging hole 15b of the magnetic recording disc 10 is aligned with the engaging holes 16a and 16b of the hub members 13 and 14, to define an engaging hole together. In this condition, the upper end portions of the connecting pins 18f, 18g and 18h (represented by reference numeral 18 in FIG. 4(G)) of the lower hub member 14 are projected slightly over the upper end surface 14a of the boss of the lower hub member 14, i.e., upper end portions of the through-holes 19f, 19g and 19h of the upper hub member 13 as shown in the one-dot chain line in FIG. 4(G). Then the upper end portions of the connecting pins 18f, 18g and 18h are subjected to, e.g., ultrasonic waves as shown by arrow marks P in FIG. 4(G). Thereby the upper end portions of the connecting pins 18f, 18g and 18h are made molten to be welded to the stepped portions of the through-holes 19f, 19g and 19h of the upper hub member 13 respectively so that the connecting pins 18f, 18g and 18h are integrally connected with the upper hub member 13 with interposition of the magnetic recording disc 10. Other components in this modification are constructed in a similar manner to that of the embodiment as shown in FIGS. 1 through 4(C).

Since, in the aforementioned construction, the heat radiated by the ultrasonic welding is received by the upper end portions of the connecting pins of the lower hub member 14 alone, thermal influence to the boss 14a of the lower hub member 14 can be minimized and thus the inner side surface of the boss 14a is prevented from being deformed.

Though the connecting pins are provided in the lower hub member and the through-holes are formed in the upper hub member in the aforementioned embodiment, the upper hub member may have the connecting pins and the lower hub member may have the through-holes. Further, the connecting pins may be provided in both of the upper hub member and the lower hub member while forming through-holes in corresponding portions of the lower hub member and the upper hub member.

The numbers of the connecting pins and the through-holes are not limited to those of the aforementioned embodiment in which three connecting pins are provided in the lower hub member and three through-holes are formed in each of the magnetic recording disc and the upper hub member. That is, two or more than four connecting pins may be provided in either the upper hub member or the lower hub member, or, the upper hub member may have one connecting pin and the lower hub member may have one connecting pin. In either case, through-holes are formed in the lower hub member, the upper hub member and the magnetic recording disc at portions corresponding to the connecting pins.

Further, though the upper portions of the connecting pins provided in the lower hub member are projected slightly upwardly over the upper surface of the boss in the aforementioned embodiment, the upper portions of the connecting pins may be positioned to be below the upper surface of the boss. Besides, the upper hub member and the lower hub member may be integrally welded with each other without forming any stepped portion, though the through-hole provided in the upper hub member has the stepped portion in the aforementioned embodiment.

The connecting pin provided in the lower hub member also functions to prevent rotation of the magnetic recording disc in the aforementioned embodiment, though, there may be independently provided a conventional rotation-preventing pin, i.e., a pin for properly locating the magnetic recording disc 10.

Still further, though the upper portions of the connecting pins are welded by ultrasonic waves to be deformed in the aforementioned embodiment, such deformation of the upper portions of the connecting pins may be performed by other heating means without utilizing ultrasonic waves.

Referring again to FIGS. 1 and 2, the cartridge case 1 has a pair of slots 21 formed in the set region S for the magnetic recording disc 10 for receiving a magnetic recording head H of the recording/reproducing apparatus which moves in a radial direction of the magnetic recording disc 10 as shown by an arrow mark a in FIGS. 1 and 2. In the cartridge case 1, there are formed annular wall members 22 and 23 provided coaxially with the through-holes 9 and shutter members 24 and 25 for rotatably blocking the slots 21. The shutter members 24 and 25 are formed by, e.g., synthetic resin or metal plates, and respectively have engaging holes 26 and 27 formed in the base end portions thereof which are to be engaged with the annular wall members 22 and 23 for rotational movement of the shutter members 24 and 25 between slot-opening positions and slot-closing positions. The top section 2 and the bottom section 3 further include concavities 28 and 29 for setting the shutter members 24 and 25 and selector indication openings 30 and 31, and the magnetic recording disc 10 has an opening 32 formed in correspondence to the indication openings 30 and 31 while the shutter members 24 and 25 include recessed openings 33 and 34 formed in correspondence to the indication openings 30 and 31.

Reference numeral 35 indicates a slider for controlling rotation of the shutter members 24 and 25 to open and close the slots 21, which is formed by, e.g., synthetic resin in the form of a belt to be capable of bending deformation in conformity to a bent portion of a sliding groove as hereinafter described. Though the slider 35 may be formed by a flexible metal sheet, it is preferably formed by resin as in this embodiment in view of conformity to the cartridge case 1 and forming workability. Particularly in this embodiment, since the slider 35 is formed such that the forward end portion conforming to the bent portion alone is thin for facilitating bending deformation thereof in sliding movement, the thickness of the slider 35 can be easily controlled by resin forming.

Figure 5:
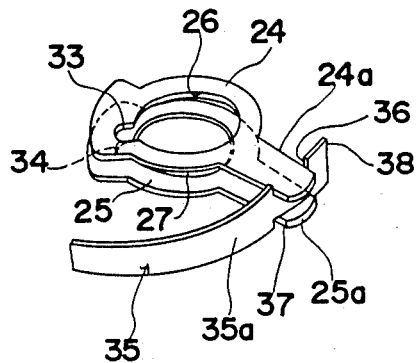
FIG. 5 is a partial perspective view showing a way of engagement of a slider with a shutter member.
Figure 6:
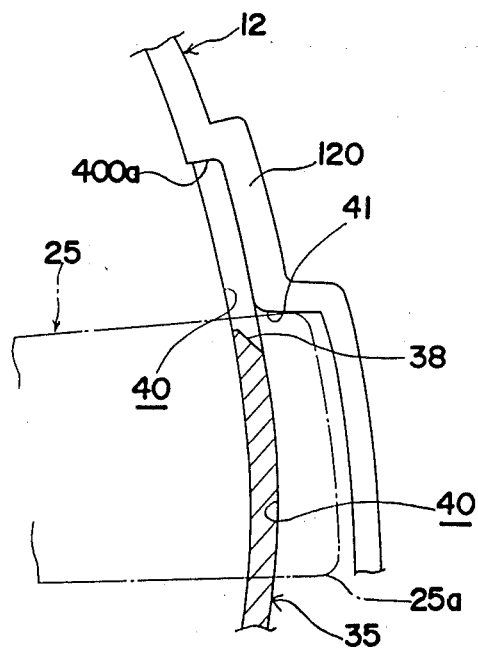
FIG. 6 is a partial top plan view of the slider.

The forward end portion 35a of the slider 35 is provided with recessed engaging portions 36 and 37 which engage with free end portions 24a and 25a of the shutter members 24 and 25 as shown in FIG. 5 while the front edge of the slider 35 is tapered to form an outwardly tapered surface 38 as shown in FIG. 6. Therefore, even if the deformed portion of the slider 35 is going to be deviated from sliding grooves 40, the tapered surface 38 slanty strikes stopper walls 41 as shown in FIG. 6 to be sprung back inwardly, thereby facilitating proper closing operation of the shutter members 24 and 25. Reference numeral 39 indicates a hook projectingly formed in the inner side surface of a base portion 35b of the slider 35.

The sliding grooves 40 for engaging with the upper and lower edges of the slider 35 respectively have curved portions 40a extending in arcuate forms from positions foreward of the stopper walls 41 (FIG. 6) in the shutter-closing direction in closed positions of the shutter members 24 and 25 rearwardly along the front outer edge of the magnetic recording disc set region S and linear portions 40b extending from the curved portions 40a rearwardly along the cartridge case 1.

A return spring 42 is embedded between the slider 35 and the cartridge case 1, of which one end 42a is in contact with the hook 39 of the slider 35 while the other end 42b is positioned rearwardly of the base end portion of the slider 35 in a closed position of the shutter members 24 and 25 to be in contact with a contact pin 43 projectingly provided in, e.g., the inner wall of the bottom section 3 so that the return spring 42 exerts spring force to the slider 35 to urge the shutter members 24 and 25 toward closed positions. Reference numeral 44 indicates a projection formed in the outer side surface of the base portion 35b of the slider 35 to be manually operated by an operator.

Figure 7:
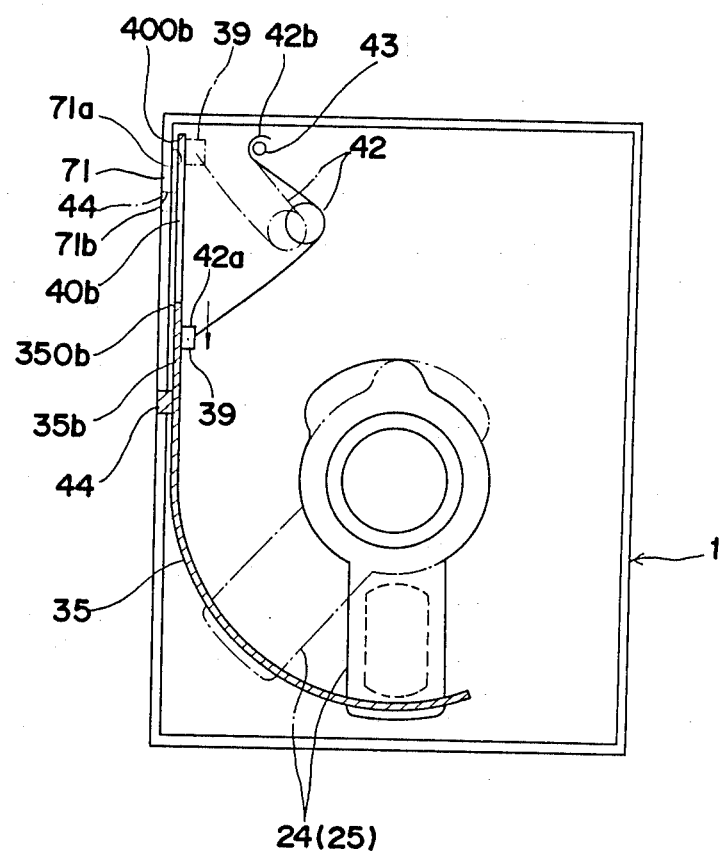
FIG. 7 is a top plan view showing an essential portion of the slider used in the embodiment shown in FIG. 1.

The base portion 35b of the slider 35 having the hook 39 for being in contact with the one end 42a of the return spring 42 is so extended that the base end portion 350b thereof is placed rearwardly of a region in the vicinity of the contact pin 43 when the shutter member 24 (25) is situated in an opened position as shown in FIG. 7. By virtue of this, the hook 39 is located to be in a position opposite to an inner surface 71a of an outer peripheral wall 71 provided in the cartridge case 1 adjacent to the sliding grooves 40 in the shutter-opening position.

In this position, therefore, even if the return spring 42 laterally presses the hook 39, the slider 35 is effectively supported by the outer peripheral wall 71 and is prevented from disengagement from the sliding groove 40. Needless to say, the linear portions 40b of the sliding grooves 40 are also extended as shown in FIG. 7 such that rear end portions 400b thereof are placed rearwardly of the region in the vicinity of the contact pin 43 correspondingly to the extended portion of the base end portion 350b of the slider 35.

The restriction wall for supporting the hook 39 is not limited to the outer peripheral wall 71 and may be provided in any appropriate position corresponding to the sliding grooves 40. The position for stopping the slider 35 may be controlled by making the base end portion 350b of the slider 35 in contact with the inner surfaces of the outer peripheral walls 4 and 5 of the top section 2 and the bottom section 3 or in contact with the rear end portions 400b of the sliding grooves 40, or by making the projection 44 formed in the outer side surface of the base end portion 350b of the slider 35 in contact with the forward end surface 71b of the outer peripheral wall 71.

A portion 120 of the partition wall 12 of the bottom section 3 surrounding the magnetic recording disc set region S, corresponding to the forward end of the curved portion 40a, i.e., the portion ranging from a position corresponding to the stopper wall member 41 to a position corresponding to the forward end of the curved portion 40a, is set to have a height h longer than a half of the distance $H_O$ between the inner walls of the top section 2 and the bottom section 3.

For assembling the slider 35 in the bottom section 3, the forward end portion of the slider 35 is bent along the curved portion 40a of the sliding groove 40 to be engaged therewith, and after the return spring 42 is engaged with the hook 39, the top section 2 is connected to the bottom section 3. In this case, vibration may cause the bent forward end portion 35a of the slider 35 disengaged from the sliding groove 40 by restoring force thereof, and thus operation of assembling of the slider 35 is quite difficult.

However, since the height h of the portion 120 of the partition wall 12 corresponding to the bent forward end portion 35a of the slider 35 is set to be longer than the half of the distance $H_0$ between the inner walls of the top section 2 and the bottom section 3 as hereinabove described, the forward end portion 35a of the slider 35 engaged with the sliding groove 40 is prevented from disengagement from the curved portion 40a of the sliding groove 40 by the elevated portion 120 of the partition wall 12, thereby securing assembling of the slider 35 in the cartridge case 1 to improve operation workability.

The entire periphery of the partition wall 12 may be formed in an elevated manner, though, the partition wall 12 is preferably formed such that the portions other than the portion 120 have a vertical length corresponding to half of the distance H between the inner walls of the top section 2 and the bottom section 3 in view of simplicity in forming thereof.

The top section 2 and the bottom section 3 are further provided on both lateral sides of the front part of the cartridge case 1 with through-holes 45 and 46 for receiving reference poles R of the recording/reproducing apparatus for securing the cartridge case 1 in a standard position on the recording/reproducing apparatus. The through-hole 45 formed in the bottom section 3 is larger in diameter than the through-hole 45 formed in the top section 2, and vice versa with respect to the other through-hole 46. The bottom section 3 has an annular wall member 47 projectingly formed around the large-diametrical through-hole 45 and the top section 2 has another annular wall member 48 projectingly formed around the small-diametrical throughhole 45, and the annular walls 47 and 48 are formed to have a vertical length corresponding to the half of the distance $H_0$ between the inner walls of the top section 2 and the bottom section 3 to be in contact with each other at the forward end surfaces. In a similar manner, an annular wall member 49 is projectingly formed within the bottom section 3 around the small-diametrical through-hole 46 while another annular wall member 50 is projectingly formed within the top section 2 around the large-diametrical through-hole 46, and the annular wall members 49 and 50 are likewise in contact with each other at the forward end surfaces.

When the magnetic recording disc cartridge is mounted in the recording/reproducing apparatus, reference poles R (FIG. 8) enter the through-holes 45 and 46 as far as the vertical center portions thereof, though, if the reference poles R strike, e.g., the peripheral edges of the through-holes 45 and 46, the top section 2 and the bottom section 3 might be deformed at portions along the through-holes 45 and 46, leading to difficulty in vertical alignment of the top section 2 and the bottom section 3 as well as damage of the deformed portions.

However, since the top section 2 and the bottom section 3 in the aforementioned construction are provided with the annular wall members 47 through 50 surrounding the through-holes 45 and 46, having the upper surfaces of the wall members 47 and 49 in contact with the lower surfaces of the wall members 48 and 50 respectively, the portions around the through-holes 45 and 46 are so effectively reinforced that the portions are prevented from deformation even if struck by the reference poles R, thus being properly aligned in the vertical direction without any displacement. Particularly in the shown embodiment, the portions of the top section 2 and the bottom section 3 surrounding the entering reference poles R are effectively prevented from deformation by virtue of butting effects of the annular wall members 47 through 50 against striking force of the reference poles R.

FIGS. 13(A) and 13(B) show a modification of the wall members in which annular wall members for surrounding through-holes 45 and 46 are projectingly formed in either the top section 2 or the bottom section 3. That is, with respect to the through-holes 45, an annular wall member 470 is projectingly formed around the large-diametrical hole 45 formed in the bottom section 3 to be in contact with the inner wall of the top section 2, and with respect to the other through-holes 46, an annular wall member 500 is projectingly formed around the large-diametrical hole 46 formed in the top section 2 to be in contact with the inner wall of the bottom section 3, effecting reinforcement along the portions around the through-holes 45 and 46 similarly to the aforementioned embodiment.

The annular wall member 470 may be formed in the top section 2 and the annular wall member 500 may be formed in the bottom section 3, though, the shown construction facilitates adaptation to variation in admission depth of the reference poles R by defining plays over the reference poles R.

Figure 8A:
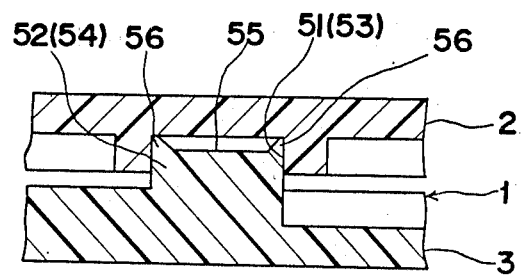
FIGS. 8(A) and 8(B) are partial cross sectional views showing a way assembling of the top section and the bottom section.
Figure 8B:
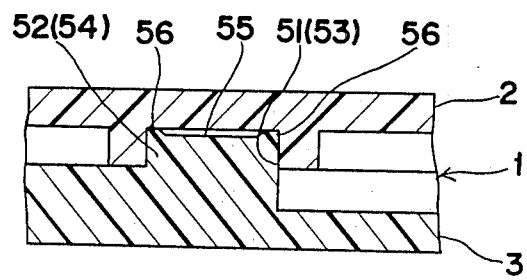

As shown in FIGS. 8(A) and (B), the top section 2 and the bottom section 3 are further provided with a concavity 51 and a convexity 52 in the vicinity of the through-holes 45 respectively for the purpose of alignment, and the concavity 51 is provided in the form of, e.g., a cylinder while the convexity 52 is provided in the form of a pole in conformity to the cylindrical concavity 51. Also in the vicinity of the other through-holes 46, a second concavity 53 and second convexity 54 respectively having the same construction as the concavity 51 and the convexity 52 are formed in the inner walls of the top section 2 and the bottom section 3. The upper end surfaces of the convexities 52 and 54 are recessed at 55 to define projections 56 around the same for ultrasonic welding operation.

The top section 2 and the bottom section 3 further include a third concavity 57 and a third convexity 58 formed in the rear part of the cartridge case 1 to be engaged with each other. The third concavity 57 and convexity 58 are located intermediately between the position in which the first concavity 51 and convexity 52 are formed and the position in which the second concavity 53 and convexity 54 are formed, and are provided in the form of a long and narrow rectangle along the longitudinal direction as shown by the arrow mark a in FIG. 2.

With the aforementioned construction, the top section 2 and the bottom section 3 are thus effectively prevented from displacement by provision of the concavities 51, 53 and 57 and the convexities 52, 54 and 58. That is, the top section 2 and the bottom section 3 are prevented from relative displacement in the longitudinal direction as shown by the arrow mark a by engagement of the first concavity 51 and convexity 52 and engagement of the second concavity 53 and convexity 54. Even if the first concavity 51 and convexity 52 and the second concavity 53 and convexity 54 are not so accurately engaged with each other that the top section 2 and the bottom section 3 are going to be deviated in the lateral direction as shown by an arrow mark b, such lateral deviation may be prevented by engagement of the third concavity 57 and convexity 58 located in the rear part of the cartridge case 1, thereby improving accuracy in alignment of the top section 2 and the bottom section 3.

The first concavity 51 and convexity 52 and the second concavity 53 and convexity 54 are preferably welded together by ultrasonic waves respectively for preventing loosening of the top section 2 and the bottom section 3 while the third concavity 57 and convexity 58 are preferably adapted to prevention of the lateral deviation as in the embodiment. The third concavity 57 and convexity 58 may be formed similarly to the first concavity 51 and convexity 52 to be capable of ultrasonic welding, though, with the longitudinal rectangular form as shown in the embodiment, deviation in the lateral direction may be effectively prevented by the length of the third concavity 57 and convexity 58 in the longitudinal direction even if the distance between the first concavity 51 and convexity 52 and the third concavity 57 and convexity 58 is lengthened to cause the deviation in the lateral direction in, e.g., a large-sized cartridge case.

Figure 9:
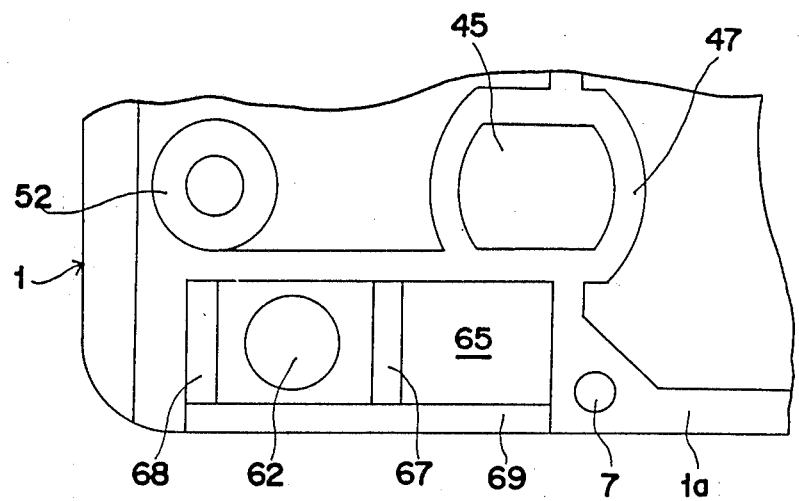
FIG. 9 is a partial plan view showing an erroneous erasing prevention member used in the embodiment shown in FIG. 1.
Figure 10:
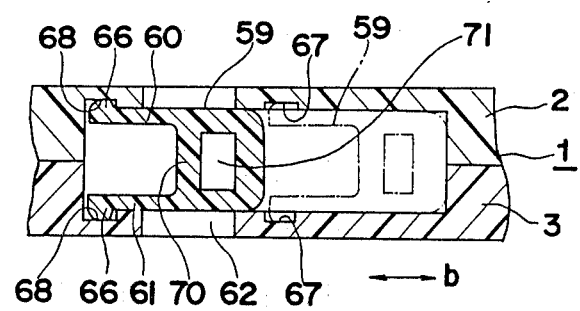
FIG. 10 is a cross sectional view of the erroneous erasing prevention member used in the embodiment in FIG. 1.
Figure 11:
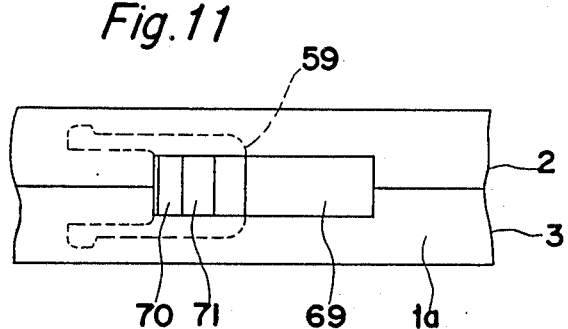
FIG. 11 is a front elevational view of the erroneous erasing prevention member shown in FIG. 10.

As shown in FIGS. 9 through 11, members 59 for preventing erroneous erasing of recorded information are formed by, e.g., synthetic resin, and respectively comprises a U-shaped movable member having a vertical pair of resilient arms 60 and 61 for selectively opening and closing transparent holes 62 and 63 (FIG. 12) formed in the vicinity of a front wall member 1a of the cartridge case 1 partially forming the peripheral walls 4 and 5 for transmitting an optical signal for detecting prevention of recording. Guide grooves 64 and 65 for guiding movement of the movable members 59 in an opening-and-closing direction as shown by the arrow mark b along the front wall member 1a are respectively formed in the inner walls of the top section 2 and the bottom section 3. The resilient arms 60 and 61 of each movable member 59 are connected with each other by a portion 70 which defines a hollow portion 71 in the movable member 59. Outward projections 66 are formed in the forward end portions of the resilient arms 60 and 61 to be movably engaged with adjusting grooves 67 and 68 formed in the bottom walls of the guide grooves 64 and 65 as shown in FIGS. 9 and 10 in correspondence to an opened position and a closed position of the movable member 59. For controlling movement of the movable members 59 from outside, the front wall 1a is provided with slots 69, through which rod members (not shown) are inserted for the controlling operation into the hollow portions 71 as shown in FIG. 11.

As shown in FIGS. 9 through 11 in detail, since the erroneous erasing prevention members for selectively opening and closing the passages for the transmission light of the optical signal for detecting prevention of recording are formed by the U-shaped movable members 59 respectively having the vertical pair of resilient arms 60 and 61 and the portion 70 connecting the resilient arms 60 and 61 for defining the hollow portion 71 into which a rod member is inserted through the slot 69 formed in the peripheral wall of the cartridge case 1 for movement of the movable member 59 between the opened position and the closed position, such opening and closing operation can be further simply and reliably controlled in comparison with a conventional erroneous erasing prevention member. Further, there is required no means for manually operating the movable members 59 which might cause erroneous operation, leading to improvement in reliability of the erroneous erasing prevention means.

Though the connecting portion 70 is shown as projected from the side surface of the movable member 59 in FIG. 1, it is merely for the purpose of visual recognition of the opened and closed positions of the movable members 59 from outside, and the connecting portion 70 does not function as means for manual operation as in the conventional erroneous erasing prevention means. Therefore, such projection of the connecting portion 70 can be optionally set not to cause erroneous operation, and the connecting portion 70 is not necessarily projected. Further, since the hollow portion 71 defined by the connecting portion 70 is adapted to receive a rod member inserted from outside for moving the movable member 59, the form of the hollow portion 71 may be modified to define a receptacle having a blocked other end in place of the hollow portion 71. Still further, though the slot 69 is formed in the front part of the cartridge case 1, i.e., in the peripheral wall thereof at the portion to be inserted into the recording/reproducing apparatus in the embodiment, it may be formed at the side surface of the cartridge case 1.

Assembling of the magnetic recording disc cartridge is hereinafter described in detail.

The engaging holes 26 and 27 of the shutter members 24 and 25 are engaged with the annular wall members 22 and 23 of the top section 2 and the bottom section 3 and then the projections 22a and 23a formed in the forward end surfaces of the annular wall members 22 and 23 are heated and pressed to prevent displacement of the shutter members 24 and 25. The magnetic recording disc 10 is placed on the upper surface of the lower hub member 14 while the boss 14a thereof is engaged with the central hole 16 of the upper hub member 13 as shown in FIG. 4(A), and then the upper hub member 13 is pressed against the lower hub member 14 so that the stepped portion 20 is welded by ultrasonic waves as shown in FIG. 4(B) to integrally connect the upper hub member 13 and the lower hub member 14 with each other with interposition of the magnetic recording disc 10, and thereafter the hub assembly is engagingly placed in the inner edge of the through-hole 9 of the bottom section 3.

The recessed engaging portions 36 and 37 of the slider 35 are engagingly placed between the free end portions 24a and 25a of the shutter members 24 and 25 while the forward end portion of the slider 35 is bent to be engaged with the sliding groove 40 of the bottom section 3 and the return spring 42 is placed between the hook 39 of the slider 35 and the contact pin 43 of the bottom section 3. The movable members 59 are placed in the guide grooves 65 of the bottom section 3.

Then the first concavity 51 and convexity 52, the second concavity 53 and convexity 54 and the third concavity 57 and convexity 58 are engaged with each other respectively for effecting vertical alignment of the top section 2 and the bottom section 3 while the welding portions 6 and 7 are engaged to be subjected to ultrasonic welding while pressing the top section 2 against the bottom section 3 as shown in FIG. 3(A). At this time, the stepped portion 8 of one welding portion 6 is made molten by the ultrasonic waves deposited to the forward end portion of the other welding portion 7 as shown in FIG. 3(B) to integrally connect the top section 2 and the bottom section 3 with each other. Connection of the top section 2 and the bottom section 3 is reinforced by applying the ultrasonic waves to the first concavity 51 and convexity 52 and the second concavity 53 and convexity 54 so that the projections 56 in the forward peripheral edges of the convexities 52 and 54 are molten from the condition shown in FIG. 8(A) to that shown in FIG. 8(B) to be deposited to the concavities 51 and 53.

Explanation is now made on utilization of the magnetic recording disc cartridge having the aforementioned construction.

For the recording operation, it is checked whether the through-holes 62 and 63 for the recording prevention detecting optical signal are blocked by the movable members 59 or not. The recording operation can be carried out when the movable member 59 is in the closed position as shown by the solid line in FIG. 10, while the recording cannot be effected when the movable member 59 is in the opened position as shown by the phantom line in FIG. 10.

Figure 12:
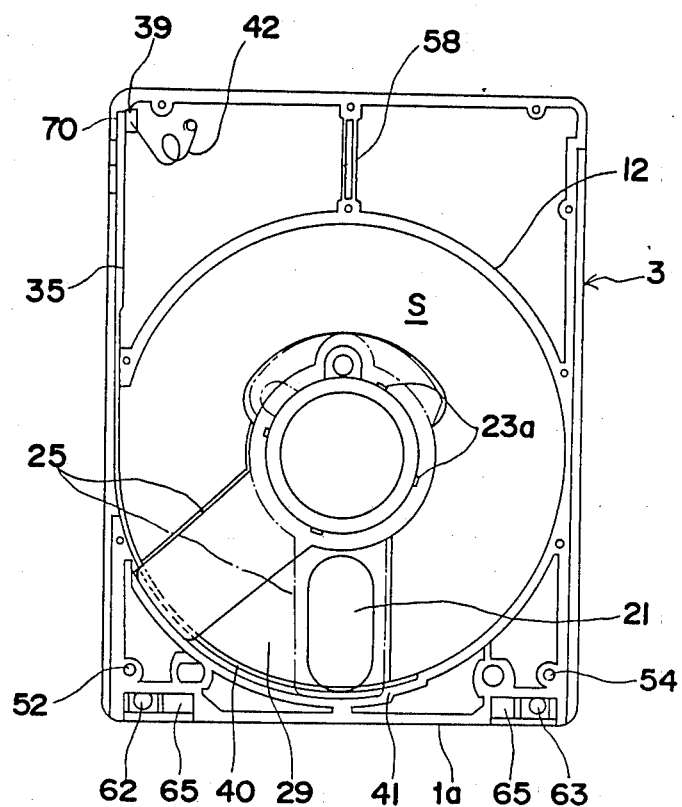
FIG. 12 is a top plan view showing operation of a shutter member used in the embodiment of FIG. 1.

Then the cartridge case 1 is frontwardly inserted in the recording/reproducing apparatus (not shown) to engage the projection 44 of the slider 35 with an engaging member (not shown) of the recording/reproducing apparatus so that the slider 35 is rearwardly moved against the spring force of the return spring 42 to rotate the shutter members 24 and 25 toward the opened positions as shown by the solid lines in FIG. 12, thereby opening the slots 21 and the selector indication openings 30 and 31. Upon opening of the slots 21, the magnetic recording head H comes into contact with the magnetic recording disc 10 so that the magnetic recording disc 10 is rotated by the drive shaft P engaged with the hub assembly, thereby enabling recording on the magnetic recording disc 10 or reproduction of information recorded therein.

When the cartridge case 1 is removed from the recording/reproducing apparatus, the slider 35 is frontwardly urged by the spring force of the return spring 42 to rotatingly return the shutter members 24 and 25 to the closed positions to block the slots 21, thereby protecting the magnetic recording disc 10 from dust.

In a case where it is not necessary to rewrite information recorded in the magnetic recording disc 10, the movable members 59 are moved to the opened positions as shown by the one-dot chain line in FIG. 10 to open the transparent holes 62 and 63.

According to the present invention, as hereinabove described, deformation of the magnetic recording disc is prevented by the clearances 13c and 13d defined between opposite surfaces of the upper and lower hub members even if the magnetic recording disc is caused to be deformed when being interposed between the hub members, so that the deformation is not extended outwardly of the outer peripheral surface of the hub assembly.

It is an advantage of the present invention that the return springs for the sliders can be simply assembled in the cartridge case and securely kept in position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording disc cartridge which comprises;
a cartridge case composed of a pair of plate members placed opposite to each other with a predetermined space therebetween, one of said plate members having a first opening for receiving a drive shaft of a recording/reproducing apparatus and a second opening for receiving a magnetic recording head of said recording/reproducing apparatus;
a magnetic recording disc formed by a magnetic recording sheet having a central hole defined in a central portion thereof; and
a hub assembly mounted in said central hole of said magnetic recording sheet and having a central hole for receiving a drive shaft of said recording/reproducing apparatus, said magnetic recording disc being rotatably contained in said predetermined spaced between said pair of plate members of said cartirdge case in such a manner that said central hole of said hub assembly is opposed to said first opening, said hub assembly being composed of an upper hub member and a lower hub member respectively positioned on opposite sides of the disk, each said hub members comprising corresponding, radial, inner and outer portions inseparably connected with each other, said inner portions engaging a portion of said recording sheet peripherally surrounding said central hole between respective surfaces of said inner portions of said hub members, said outer portions of said upper and lower hub members having respective opposed surfaces adjacent the recording sheet which are spaced apart a greater distance than the thickness of said recording sheet thereby forming clearances between respective surfaces of said magnetic recording disc and said opposed surfaces of said hub-outer portions of said hub members.

2. The magnetic recording disc cartridge according to claim 1, wherein said hub assembly is provided with an engaging means around said central hold on that surface of said hub assembly said first opening of said cartridge case for engagement with the driving shaft of said recording/reproducing apparatus for rotation of said recording disc.

3. The magnetic recording disc cartridge according to clam 1 wherein said hub members respectively have projectingly-formed stepped surfaces to be butted with each other in said opposite surfaces at inward portions in the radial direction, thereby clampingly holding said peripheral portion of said central hole of said magnetic recording sheet therebetween.

4. The magnetic recording disc cartridge according to claim 1, wherein said lower hub member is provided with a boss having a central hole in a central portion of said lower hub member, said upper hub member being provided with a central hole in a central portion thereof for fitting with the boss of said lower hub member, said lower hub member and upper hub member being connected together by fitting the boss of said lower hub member in the central hole of said upper hub member, said hub members respectively having projectingly formed facing stepped surfaces to be butted with each other at said inner portions in a radial direction, thereby holding said peripheral portion of said central hole of said magnetic recording sheet therebetween.

5. The magnetic recording disc cartridge according to claim 1, wherein said lower hub member is provided with a boss having a central hole in a central portion of said lower hub member, said upper hub member being provided with a central hole in a central portion thereof for fitting with the boss of said lower hub member, said lower hub member and said upper hub member being connected together by fitting the boss of said lower hub member in the central hole of said upper hub member.

6. The magnetic recording disc cartridge according to claim 5, wherein said hub members are formed of plastic resin material integrally connected with each other by ultrasonic welding under a concave-convex engaging manner between the boss of said lower hub member and the central hole of said upper hub member.

7. The magnetic recording disc cartridge according to claim 5, wherein said hub members are formed of plastic resin material integrally connected with each other by ultrasonic welding under a concave-convex engaging manner between the boss of said lower hub member and the central hole of said upper hub member, said hub members having respectively projectingly formed facing stepped surfaces to be butted with each other at said inner portions in a radial direction, thereby holding said peripheral portion of said central hole of said magnetic recording sheet therebetween.

* * * * *